(12) United States Patent
Urish et al.

(10) Patent No.: US 6,320,773 B1
(45) Date of Patent: Nov. 20, 2001

(54) TRANSFORMER/RECTIFIER FOR AIRCRAFT GROUND POWER UNIT

(75) Inventors: Joseph Michael Urish, Lima; Jerome John Sirotnik, Dayton; David Wayne Leadingham, Enon; Daniel Lee Downey, Tipp City, all of OH (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/715,309

(22) Filed: Nov. 17, 2000

Related U.S. Application Data
(60) Provisional application No. 60/242,504, filed on Oct. 23, 2000.

(51) Int. Cl.$^7$ .................................................. H02M 7/04
(52) U.S. Cl. .............................. 363/92; 363/87; 323/361
(58) Field of Search .......................... 363/34, 75, 84, 363/87, 92, 129, 355; 323/361

(56) References Cited

U.S. PATENT DOCUMENTS

| | | | |
|---|---|---|---|
| 3,573,602 | 4/1971 | Jensen | 321/9 |
| 4,068,157 | * 1/1978 | Bassett | 363/75 |
| 4,122,517 | 10/1978 | Hayashi et al. | 363/85 |
| 4,208,709 | 6/1980 | Garnham et al. | 363/90 |
| 4,493,016 | 1/1985 | Cham et al. | 363/126 |
| 4,663,702 | 5/1987 | Tanaka | 363/65 |
| 5,050,058 | 9/1991 | April et al. | 363/65 |
| 5,267,137 | * 11/1993 | Goebel | 363/87 |
| 5,446,646 | 8/1995 | Miyazaki | 363/89 |
| 5,539,632 | * 7/1996 | Marsh | 323/361 X |
| 5,596,490 | 1/1997 | Kaufmann | 363/63 |
| 5,781,428 | 7/1998 | Paice | 363/126 |
| 6,026,006 | 2/2000 | Jiang et al. | 363/132 |

* cited by examiner

Primary Examiner—Jessica Han
(74) Attorney, Agent, or Firm—Thompson Hine LLP

(57) ABSTRACT

A ground power unit for providing dc power for aircraft includes a source of 3-phase ac power and a transformer/rectifier arrangement for converting 3-phase ac power to dc power. The transformer/rectifier arrangement includes an A-phase transformer formed by an A-phase magnetic member, an A-phase primary winding having first and second sides, and an A-phase secondary winding; a B-phase transformer formed by a B-phase magnetic member, a B-phase primary winding having first and second sides, and a B-phase secondary winding; and a C-phase transformer formed by a C-phase magnetic member, a C-phase primary winding having first and second sides, and a C-phase secondary winding. The A-phase primary winding first side is connected to receive A-phase power, the B-phase primary winding first side is connected to receive B-phase power, and the C-phase primary winding first side is connected to receive C-phase power. The A-phase primary winding second side, B-phase primary winding second side and C-phase primary winding second side are connected together for delivering current traveling out of one of the second sides into at least one of the other second sides.

15 Claims, 6 Drawing Sheets

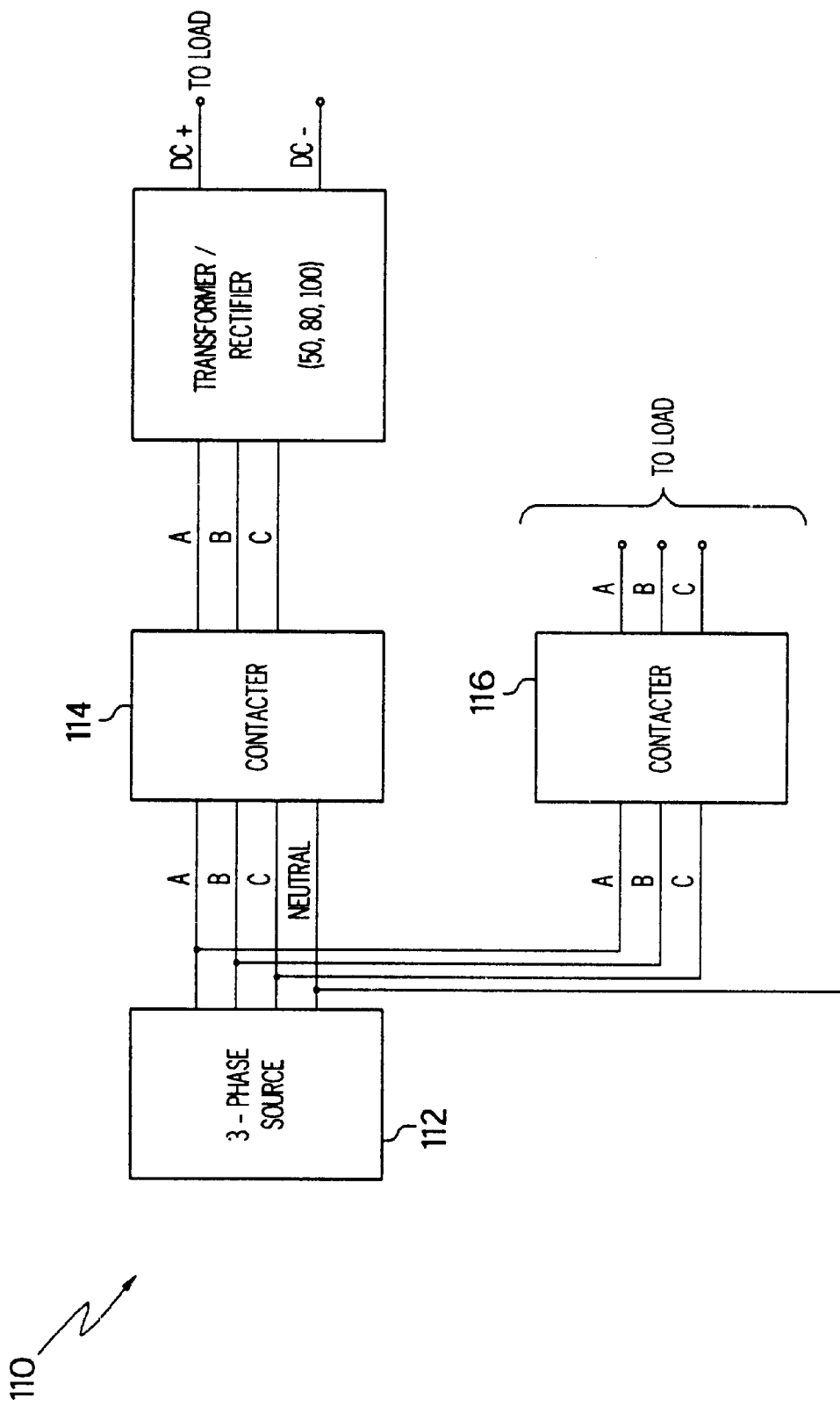

TRANSFORMER/RECTIFIER FOR AIRCRAFT GROUND POWER UNIT

CROSS REFERENCE TO RELATED APPLICATIONS

This application claims the benefit of provisional application Ser. No. 60/242,504, filed Oct. 23, 2000.

FIELD OF THE INVENTION

The present invention relates generally to aircraft ground power units and transformer/rectifier systems used in such units for converting 3-phase ac input into a substantially stable dc output and, more particularly, to a transformer/rectifier arrangement which provides reduced voltage drops across diodes in high output current systems.

BACKGROUND OF THE INVENTION

Aircraft ground power units are utilized to power aircraft when on the ground. Larger aircraft tend to utilize ground power units which output ac power while smaller aircraft tend to utilize ground power units which output dc power, typically at about 28 volts and in the range of several hundred amps. In ground power units that output dc power, the dc power may be developed from a 3-phase ac source such as a static converter or a generator. In either case a transformer/rectifier arrangement may be used to convert the 3-phase ac power to the desired dc output.

Transformer/rectifier configurations for converting 3-phase power to a dc output are known, with each configuration including its own set of advantages and disadvantages. One such configuration 10 is illustrated in FIG. 1 which shows a full wave center tap connection 12 with 6 pulse rectification of a 3-phase (A, B, C) input. Notably, the 3 input phases A, B, and C are connected in a STAR (Y) configuration 14 and share a common neutral connection 16, and a single 3-phase transformer 18 defined by one magnetic member can be used for coupling the primary windings 20A, 20B, 20C to the secondary windings 22A, 22B, 22C. Each side of each secondary winding connects to the anode side of a respective diode 24 (d1–d6) to provide the 6 pulse rectification. Notable characteristics of this arrangement are (1) that only one diode 24 conducts at any one time such that each diode conducts for 60 electrical degrees with its peak current equal to the dc load current and (2) the current rating of each transformer secondary winding is 0.408 times the dc load current. Characteristic (1) is undesired when high current systems are implemented because the voltage drop across the diodes can be significant. Characteristic (2) influences the size of the transformer because the higher the current through the secondary windings, the greater the cross-section of the wire needed to form the secondary winding of the transformer.

Accordingly, it would be desirable to provide a transformer/rectifier arrangement with lower diode drops in systems having high dc current output such as in aircraft ground power units.

SUMMARY OF THE INVENTION

In one aspect of the present invention, an aircraft ground power unit includes a transformer/rectifier arrangement for converting 3-phase ac power to dc power. The transformer/rectifier arrangement includes an A-phase transformer formed by an A-phase magnetic member, an A-phase primary winding having first and second sides, and an A-phase secondary winding; a B-phase transformer formed by a B-phase magnetic member, a B-phase primary winding having first and second sides, and a B-phase secondary winding; and a C-phase transformer formed by a C-phase magnetic member, a C-phase primary winding having first and second sides, and a C-phase secondary winding. The A-phase primary winding first side is connected to receive A-phase power, the B-phase primary winding first side is connected to receive B-phase power, and the C-phase primary winding first side is connected to receive C-phase power. The A-phase primary winding second side, B-phase primary winding second side and C-phase primary winding second side are connected together for delivering current traveling out of one of the second sides into at least one of the other second sides.

In such arrangement the A-phase, B-phase, and C-phase secondary windings are arranged in a full wave center-tap transformer output connection which includes an output for delivering current to a load when connected thereto. In operation, where the center-tap configuration includes six diodes, two diodes conduct at any one time, the peak dc current through each diode is limited to ½ the dc current delivered to the load, and the current rating of each secondary winding is 0.286 times the dc current delivered to the load.

BRIEF DESCRIPTION OF THE DRAWINGS

FIG. 6 is a block diagram of a ground power unit incorporating the transformer/rectifier arrangement of FIG. 2.

DETAILED DESCRIPTION OF THE EMBODIMENTS

Figure 2:
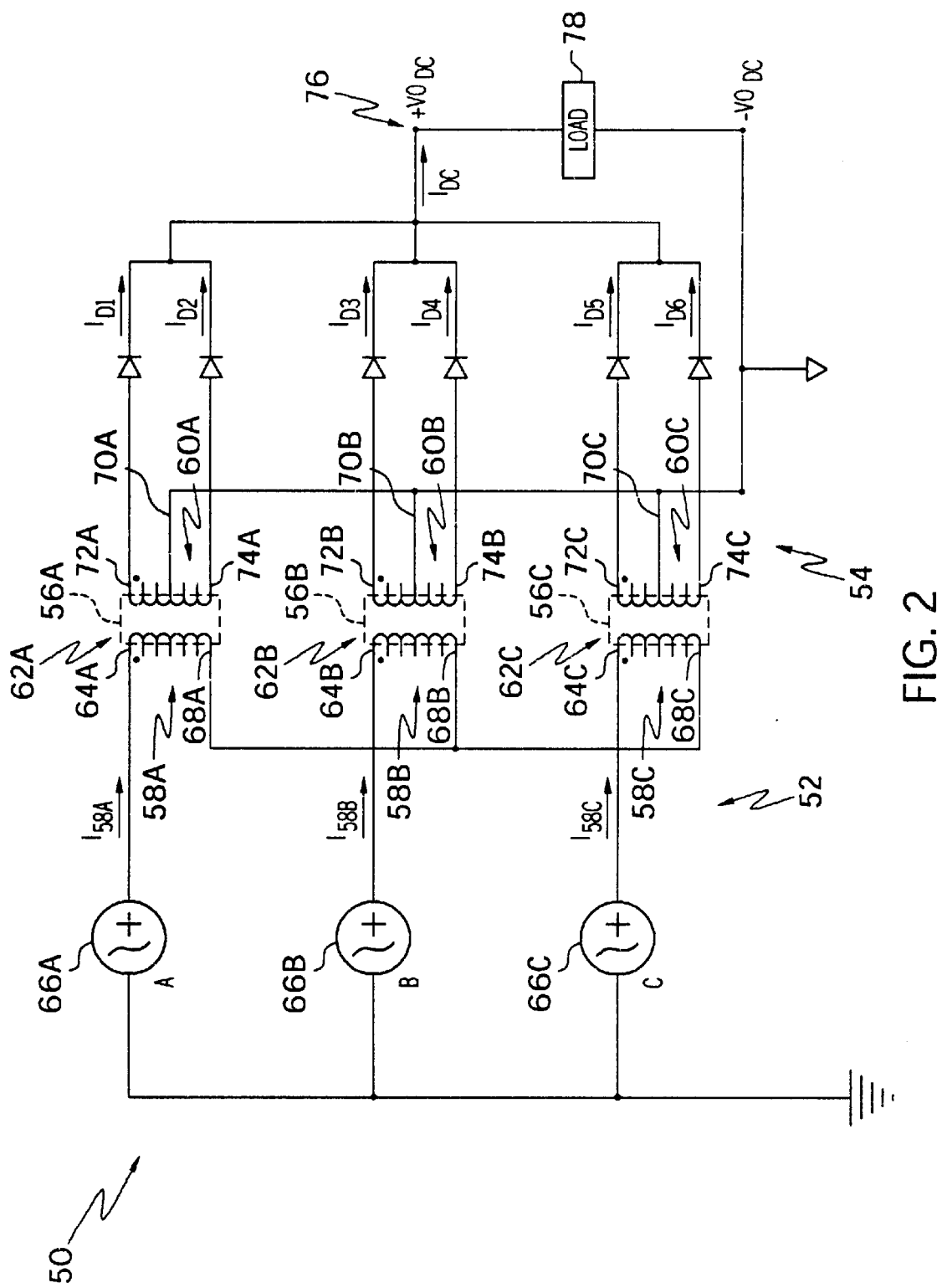
FIG. 2 is a schematic of one embodiment of a transformer/rectifier arrangement in accordance with the invention.

Referring to drawing FIG. 2, a transformer/rectifier arrangement 50 is shown including a primary side 52 and secondary side 54. Three distinct magnetic members 56A, 56B, and 56C couple the primary side 52 to the secondary side 54. The primary side 52 includes primary windings 58A, 58B, and 58C each associated with one corresponding magnetic member 56A, 56B, 56C. Similarly, the secondary side 54 includes secondary windings 60A, 60B, and 60C each associated with one corresponding magnetic member. Thus, three separate single-phase transformers 62A, 62B and 62C are formed.

Referring more particularly to primary side 52, one side 64A, 64B, 64C of each primary winding 58A, 58B and 58C is connected to receive ac power from a respective A-phase source 66A, B-phase source 66B and C-phase source 66C. The other side 68A, 68B, 68C of each primary winding 58A, 58B and 58C are connected in common. This configuration provides that current flowing out of primary winding 58A through side 68A, for example, is directed into one of the other primary windings 58B or 58C through its associated side 68B or 68C. Similarly, current flowing out of primary winding 58B through side 68B is directed into one of the other primary windings 58A or 58C through its associated side 68A or 68C, and current flowing out of primary winding 58C through side 68C is directed into one of the other primary windings 58A or 58B through its associated side 68A or 68B. The illustrated configuration is a STAR (Y) configuration with no neutral connection.

On the secondary side 54, a full-wave center tap transformer output connection is provided. In particular, in the arrangement 50 each secondary winding 60A, 60B and 60C includes a respective center-tap 70A, 70B, 70C to common. Secondary winding 60A includes sides 72A and 74A which each connect to the anode side of respective diodes D1 and D2. Similarly, secondary winding 60B includes sides 72B and 74B which each connect to the anode side of respective diodes D3 and D4, and secondary winding 60C includes sides 72C and 74C which each connect to the anode side of respective diodes D5 and D6. The cathode sides of diodes D1–D6 are connected to a common node 76 which defines an output through which current, $I_{DC}$, is delivered to a load 78 when connected thereto.

Figure 3:
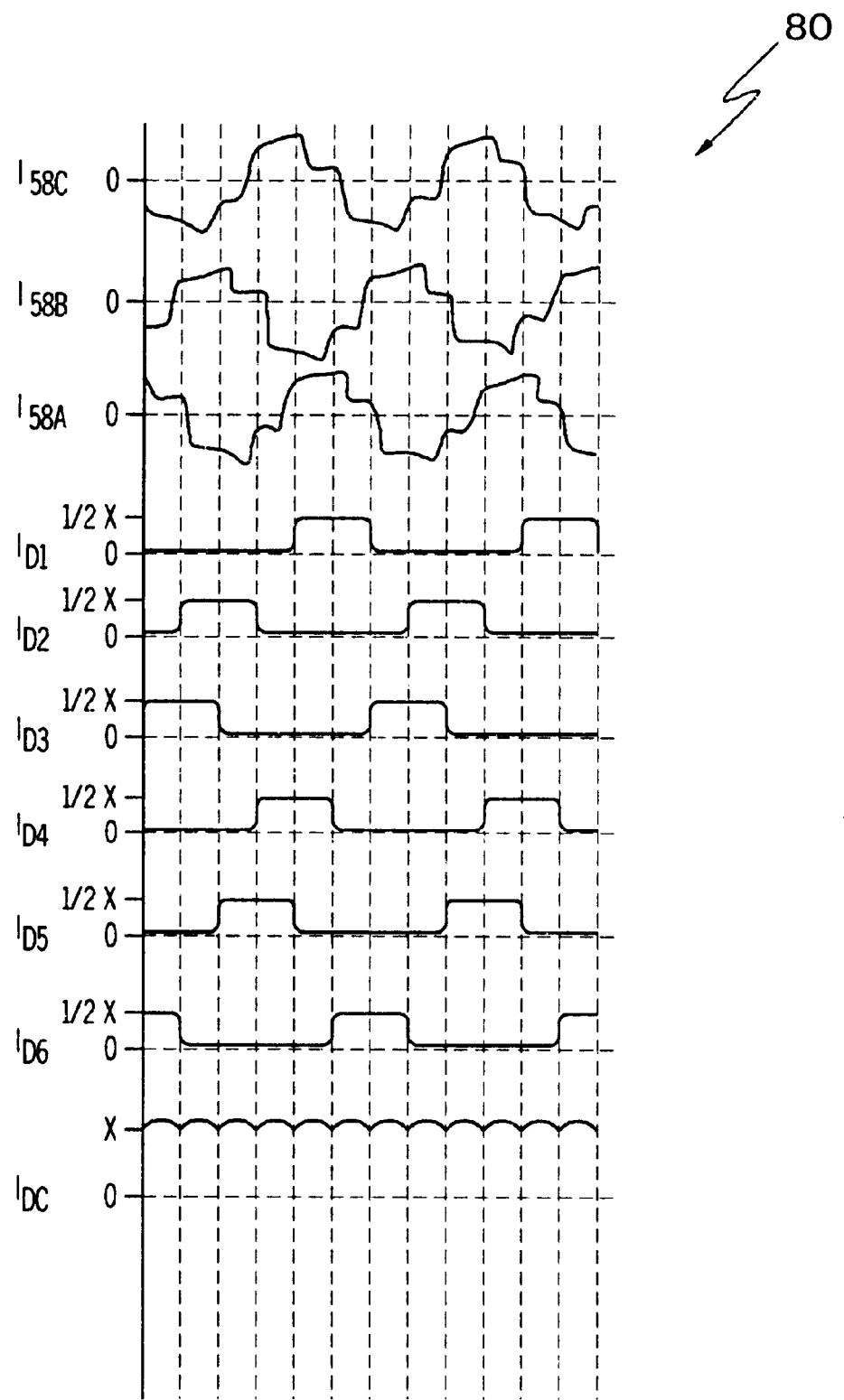
FIG. 3 is a graph showing relative timing and amplitude of currents delivered through various parts of the arrangement of FIG. 2.

The graph 80 of FIG. 3 shows the relative timing and amplitude of currents delivered to each of the primary windings 58A, 58B, and 58C, to each of the diodes D1, D2, D3, D4, D5 and D6 current, and to the load 78. As the graph demonstrates, two diodes conduct at any one time during operation of the transformer/rectifier 50, such that each diode conducts for a total of 120 electrical degrees with a peak dc current equal to ½ the load current $I_{DC}$. Further, during a switching transition of one diode from ON to OFF and another diode from OFF to ON, a third diode remains ON for the time period immediately preceding and immediately following the transition. For example, as best seen in FIG. 3, when diode D3 transitions from ON to OFF, diode D5 transitions from OFF to ON, and diode D2 remains ON for the time period immediately preceding and immediately following the transition. During such short transitions, some current can pass through both diode D3 and D5, which is often referred to as current overlap. Such current overlap can result in slight reductions in the average dc output voltage. The same current overlap occurs in the prior art arrangement of FIG. 1. However, because the peak diode current in the arrangement 50 is ½ that of the peak diode current in arrangement 10, assuming the same dc output current, the reduction in average dc output voltage in arrangement 50 may be less than that of arrangement 10. In use, the output voltage may be filtered as necessary to meet ripple requirements.

The on sequence for the diodes in arrangement 50 is set forth in Table I below:

TABLE I

Diode On Sequence

| Diode | Time → | | | | | |
|---|---|---|---|---|---|---|
| D1 | X | X | | | | |
| D2 | | | | X | X | |
| D3 | | | X | X | | |
| D4 | X | | | | | X |
| D5 | | | | | X | X |
| D6 | | X | X | | | |

The rms current rating of each secondary winding 60A, 60B and 60C is 0.286 times the dc load current $I_{DC}$ as determined by the equation below:

$$I_{rms}=(I_{DC}/2)(1/3)^{1/2}=I_{DC}(1/12)^{1/2}$$

Figure 1:
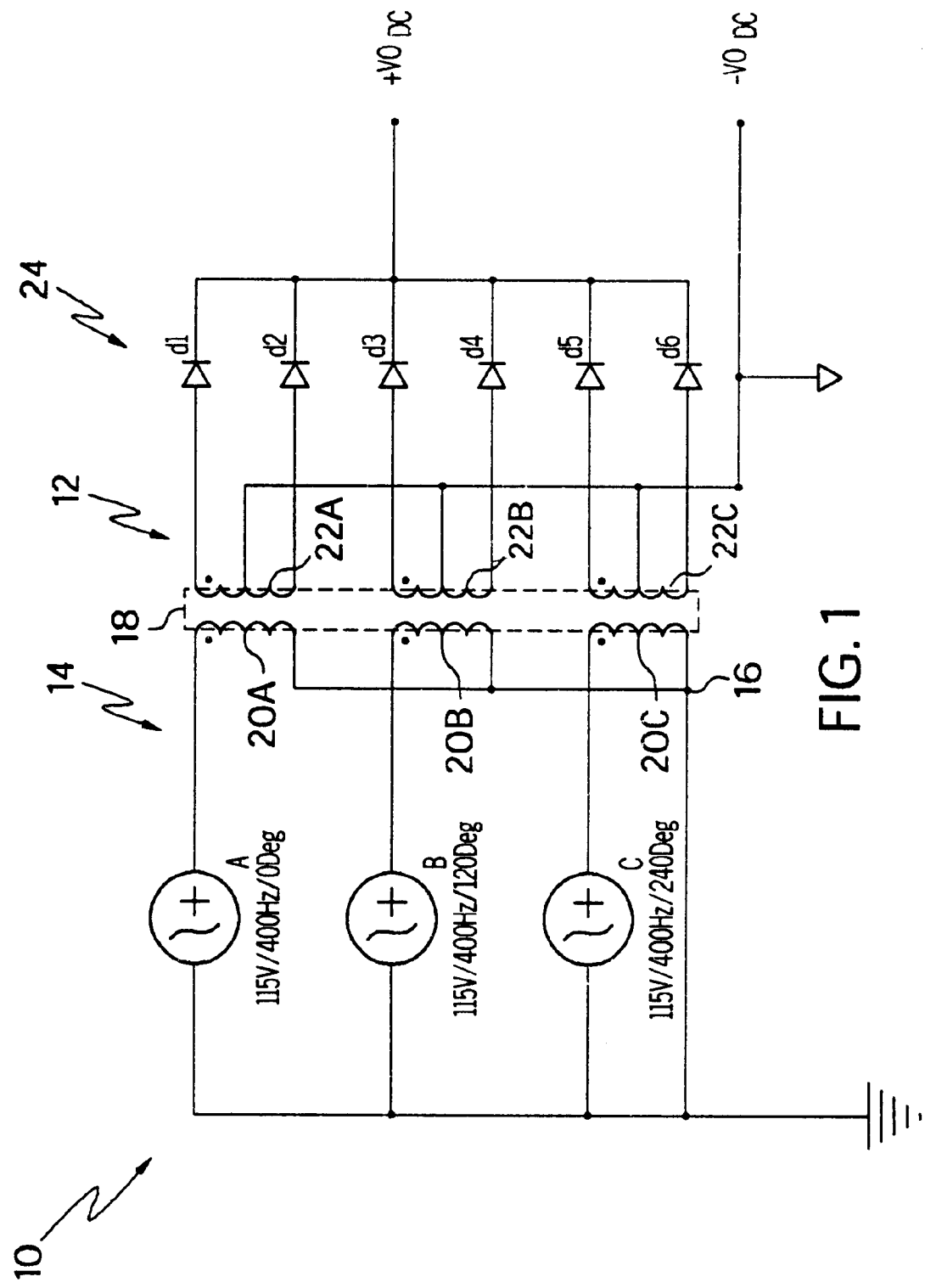
FIG. 1 is a schematic of a prior art transformer/rectifier arrangement.

As compared with the prior art arrangement 10 of FIG. 1, the voltage drop across the diodes D1–D6 will be significantly lower than across diodes d1–d6 due to the lower peak current, particularly in high current output applications. For example, in an aircraft ground power unit having a voltage output of about 28 volts and a current output ($I_{DC}$) of 300 amps or more, the arrangement 50 of FIG. 2 will typically provide at least a twenty percent (20%) reduction in voltage drop across the diodes D-D6 which carry 150 amps, as compared to the voltage drop across diodes d1–d6 in arrangement 10 of FIG. 1 where the diodes d1–d6 carry the full 300 amps of the dc output current. This reduction in voltage drop across the diodes may enable the use of smaller size, lower amp rated diodes in some applications, reducing costs.

In many applications the lower secondary winding rms current rating provided by the transformer/rectifier arrangement 50 of FIG. 2 over the arrangement 10 of FIG. 1 will enable wire of a smaller cross-section to be used on the secondary side which can make up at least partially for the fact that three magnetic members 56A, 56B, 56C arc used in the arrangement 50 as compared to one magnetic member 18 in the arrangement 10.

Figure 4:
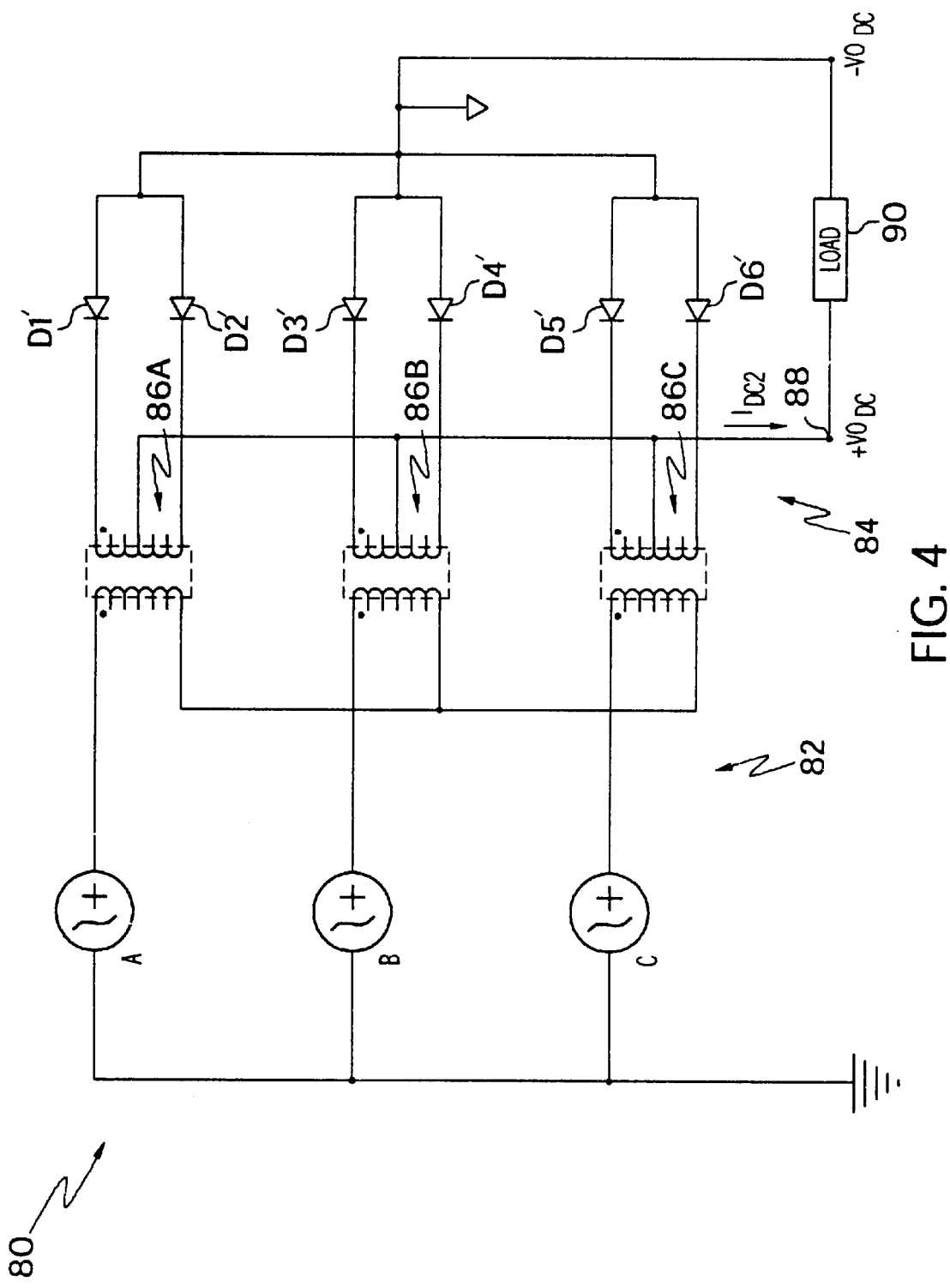
FIG. 4 is a schematic of another embodiment of a transformer/rectifier arrangement.

Another embodiment of a transformer/rectifier arrangement 80 is shown in FIG. 4. Input side 82 of arrangement 80 is shown identical to that of arrangement 50. The output side 84 of arrangement 80 includes secondary windings 86A, 86B, 86C which are also arranged in a full wave center-tap transformer output connection. However, in the arrangement 80 the diodes D1'–D6' are connected in a reverse configuration such that common node 88 of the center-taps acts as the output which delivers current $I_{DC2}$ to the load 90. In this arrangement the peak current through each diode is still ½ $I_{DC2}$, two diodes still conduct at one time, and each diode conducts for 120 electrical degrees.

Figure 5:
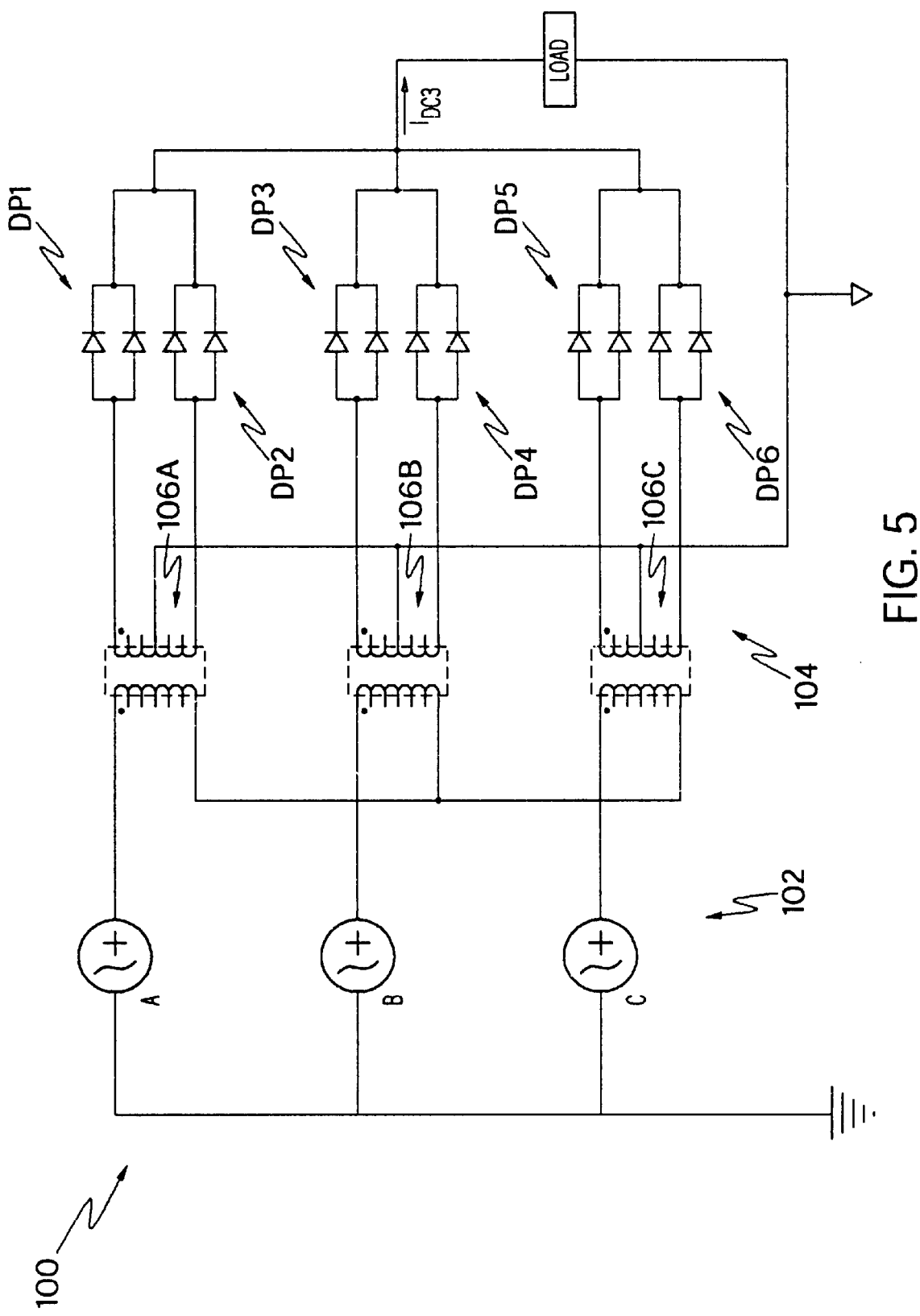
FIG. 5 is a schematic of yet another embodiment of a transformer/rectifier arrangement.

Still a further embodiment of a transformer/rectifier arrangement 100 is shown in FIG. 5. Again, input side 102 of arrangement 100 is shown identical to that of arrangements 50 and 80. The output side 104 of arrangement 80 includes secondary windings 106A, 106B, 106C which are also arranged in a full-wave center-tap transformer output connection. However, instead of utilizing six diodes, twelve diodes are used by setting up diode pairs DP1–DP6 in parallel. In this arrangement the peak current through each diode pair is one-half the dc output current $I_{DC3}$. Accordingly, the peak current through each individual diode will only be one-fourth the dc output current $I_{DC3}$. Two diode pairs will conduct at one time and each diode pair will be on for 120 electrical degrees. It is recognized that additional paralleling could be used, and that similar paralleling could be used in conjunction with arrangement 80 of FIG. 4.

One particularly useful application of the transformer/rectifier arrangements of the invention is provided in their incorporation into an aircraft ground power unit. For example, reference is made to FIG. 6 which shows a block diagram of an aircraft ground power unit (GPU) 110. The GPU 110 includes a source 112 of 3-phase ac power which, by way of example but not by way of limitation, could be a generator or a static converter. The 3-phase ac power may be on the order of 115 volts line-to-neutral, 200 volts line-to-line. A, B, and C phase outputs are fed to a contacter 114 which can be used to control delivery of the A, B, and C phase currents to the transformer/rectifier 50, 80, 100. The dc output of the transformer/rectifier, typically at about 28 volts and 300 or more amps, can then be delivered to the load (aircraft power system). A second contacter 116 may be used to deliver the 3-phase ac power to the load as well. In operation the contacters may be actuated by switches, buttons or levers of the GPU 110 which allows the user to select between outputting dc or 3-phase ac.

Although the invention has been described and illustrated in detail it is to be clearly understood that the same is intended by way of illustration and example only and is not intended to be taken by way of limitation. Accordingly, the spirit and scope of the invention are to be limited only by the terms of the appended claims.

What is claimed is:

1. An aircraft ground power unit for providing dc power for aircraft, comprising:
   a source of 3-phase ac power including A, B and C phases;
   a transformer/rectifier arrangement for converting the 3-phase ac power to dc power, including:
      an A-phase transformer formed by an A-phase magnetic member, an A-phase primary winding having first and second sides, and an A-phase secondary winding;
      a B-phase transformer formed by a B-phase magnetic member, a B-phase primary winding having first and second sides, and a B-phase secondary winding;
      a C-phase transformer formed by a C-phase magnetic member, a C-phase primary winding having first and second sides, and a C-phase secondary winding;
      wherein the A-phase primary winding first side is operatively connected to receive A-phase power from the source of 3-phase ac power, wherein the B-phase primary winding first side is operatively connected to receive B-phase power from the source of 3-phase ac power, wherein the C-phase primary winding first side is operatively connected to receive C-phase power from the source of 3-phase ac power;
      wherein the A-phase primary winding second side, B-phase primary winding second side and C-phase primary winding second side are connected together for delivering current traveling out of one of said second sides into at least one of said other second sides.

2. The unit of claim 1 wherein the A-phase, B-phase, and C-phase secondary windings of the transformer/rectifier arrangement are arranged in a full wave center-tap transformer output connection which includes an output for delivering current to a load when connected thereto.

3. The unit of claim 2 wherein the output of the transformer/rectifier arrangement is rated to deliver at least 300 amps dc.

4. The unit of claim 3 wherein the output of the transformer/rectifier arrangement is rated to deliver about 28 volts dc.

5. The unit of claim 1 wherein the first, second and third primary windings are connected to the source of 3-phase ac power through a contacter for controllably delivering the 3-phase power thereto.

6. An aircraft ground power unit for providing DC power for aircraft, comprising:
   a transformer/rectifier arrangement, including:
      an A-phase transformer formed by an A-phase magnetic member, an A-phase primary winding having first and second sides, and an A-phase secondary winding;
      a B-phase transformer formed by a B-phase magnetic member, a B-phase primary winding having first and second sides, and a B-phase secondary winding;
      a C-phase transformer formed by a C-phase magnetic member, a C-phase primary winding having first and second sides, and a C-phase secondary winding;
      wherein the A-phase primary winding first side is connected to receive A-phase power, wherein the B-phase primary winding first side is connected to receive B-phase power, wherein the C-phase primary winding first side is connected to receive C-phase power;
      wherein the A-phase primary winding second side, B-phase primary winding second side and C-phase primary winding second side are connected together for delivering current traveling out of one of said second sides into at least one of said other second sides;
      wherein the A-phase, B-phase, and C-phase secondary windings are arranged in a full wave center-tap transformer output connection which includes an output for delivering current to a load when connected thereto.

7. The unit of claim 6 wherein each secondary winding has a center-tap to ground, each secondary winding has first and second sides each connected to an anode side of a respective diode, and a cathode side of each diode connects to a common node which defines the output.

8. The unit of claim 6 wherein during operation a peak dc current through each diode of the full wave center-tap transformer output connection is ½ a load current delivered to the output.

9. The unit of claim 6 wherein during operation two diodes of the full wave center-tap transformer output connection conduct at any one time.

10. An aircraft ground power unit for selectively providing ac and dc power to an aircraft, comprising:
    a source of 3-phase power including A, B and C phases;
    a transformer/rectifier arrangement for converting 3-phase ac power to dc power, including:
       an A-phase transformer formed by an A-phase magnetic member, an A-phase primary winding having first and second sides, and an A-phase secondary winding;
       a B-phase transformer formed by a B-phase magnetic member, a B-phase primary winding having first and second sides, and a B-phase secondary winding;
       a C-phase transformer formed by a C-phase magnetic member, a C-phase primary winding having first and second sides, and a C-phase secondary winding;
       wherein the A-phase primary winding second side, B-phase primary winding second side and C-phase primary winding second side are connected together for delivering current traveling out of one of said second sides into at least one of said other second sides;
    a set of dc outputs for delivering dc power to the aircraft;
    a set of 3-phase outputs for delivering 3-phase ac power to the aircraft;
    at least one contacter connected between the 3-phase source and the transformer/rectifier arrangement for selectively connecting the transformer/rectifier arrangement to the source of 3-phase power such that when so connected the A-phase primary winding first side is connected to receive A-phase power, the B-phase primary winding first side is connected to receive B-phase power, and the C-phase primary winding first side is connected to receive C-phase power; and
    at least one contacter connected between the source of 3-phase power and the set of 3-phase outputs for selectively controlling delivery of 3-phase ac power thereto.

11. The unit of claim 10 wherein the output of the transformer/rectifier arrangement is rated to deliver at least 300 amps dc.

12. The unit of claim 11 wherein the output of the transformer/rectifier arrangement is rated to deliver about 28 volts dc.

13. An aircraft ground power unit for selectively providing ac and dc power to an aircraft, comprising:

a source of 3-phase power;

a transformer/rectifier arrangement, including:
an A-phase transformer formed by an A-phase magnetic member, an A-phase primary winding, and an A-phase secondary winding;
a B-phase transformer formed by a B-phase magnetic member, a B-phase primary winding, and a B-phase secondary winding;
a C-phase transformer formed by a C-phase magnetic member, a C-phase primary winding, and a C-phase secondary winding;
wherein the A-phase primary winding, B-phase primary winding, and C-phase primary winding are connected in a neutral free STAR (Y) configuration; and
wherein the A-phase, B-phase, and C-phase secondary windings are arranged in a full wave center-tap transformer output connection which includes an output for delivering current to a load when connected thereto;

a set of dc outputs for delivering dc power to the aircraft;

a set of 3-phase outputs for delivering 3-phase ac power to the aircraft;

at least one switching circuit for controlling delivery of 3-phase power from the source of 3-phase power to the transformer/rectifier arrangement and the set of 3-phase outputs.

14. The unit of claim 13 wherein the output of the transformer/rectifier arrangement is rated to deliver at least 300 amps dc.

15. The unit of claim 14 wherein the output of the transformer/rectifier arrangement is rated to deliver about 28 volts dc.

* * * * *

UNITED STATES PATENT AND TRADEMARK OFFICE
CERTIFICATE OF CORRECTION

| | |
|---|---|
| PATENT NO. | : 6,320,773 B1 |
| DATED | : November 20, 2001 |
| INVENTOR(S) | : Joseph Michael Urish et al. |

It is certified that error appears in the above-identified patent and that said Letters Patent is hereby corrected as shown below:

<u>Column 8, claim 13,</u>
Line 6, change "de" before the word power to -- dc --.

Signed and Sealed this

Ninth Day of April, 2002

*Attest:*

JAMES E. ROGAN
*Attesting Officer*  *Director of the United States Patent and Trademark Office*